US011050269B2

United States Patent
Shiiyama et al.

(10) Patent No.: US 11,050,269 B2
(45) Date of Patent: Jun. 29, 2021

(54) CHARGE CONTROL DEVICE AND COMPUTER READABLE STORAGE MEDIUM

(71) Applicant: HONDA MOTOR CO., LTD., Tokyo (JP)

(72) Inventors: Takumi Shiiyama, Saitama (JP); Ryo Oshima, Saitama (JP); Ryuichi Kimata, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 109 days.

(21) Appl. No.: 16/575,397

(22) Filed: Sep. 19, 2019

(65) Prior Publication Data

US 2020/0014221 A1 Jan. 9, 2020

Related U.S. Application Data

(63) Continuation of application No. PCT/JP2018/010911, filed on Mar. 19, 2018.

(30) Foreign Application Priority Data

Mar. 24, 2017 (JP) .............................. JP2017-058612

(51) Int. Cl.
*H02J 7/00* (2006.01)
*H02J 7/02* (2016.01)
*H04B 1/3827* (2015.01)

(52) U.S. Cl.
CPC .............. *H02J 7/0026* (2013.01); *H02J 7/02* (2013.01); *H04B 1/3827* (2013.01)

(58) Field of Classification Search
CPC ..................................................... H02J 7/0026
(Continued)

(56) References Cited

U.S. PATENT DOCUMENTS 10,055,911 B2   8/2018   Luke
10,065,525 B2   9/2018   Chen
(Continued)

FOREIGN PATENT DOCUMENTS

JP   2012085494 A   4/2012
JP   2014054003 A   3/2014

OTHER PUBLICATIONS

International Search Report and (ISA/237) Written Opinion of the International Search Authority for International Patent Application No. PCT/JP2018/010911, mailed by the Japan Patent Office dated May 1, 2018.

(Continued)

*Primary Examiner* — Edward Tso
*Assistant Examiner* — Ahmed H Omar (57) ABSTRACT

A charge control device can include a plurality of control units that are mutually connected by a communication line and control charging of different batteries. The control units can each include a communication state acquisition unit that acquires a communication state of another control unit of the control units through the communication line. The control units can each include a detection unit that detects an abnormality of the other control unit based on the communication state of the other control unit acquired by the communication state acquisition unit. The control units can each include a suppression unit that suppresses an operation of the other control unit for which an abnormality is detected by the detection unit.

15 Claims, 8 Drawing Sheets

(58) Field of Classification Search
USPC .......................................................... 320/126
See application file for complete search history.

(56) References Cited

U.S. PATENT DOCUMENTS

| | | | |
|---|---|---|---|
| 10,158,102 | B2 | 12/2018 | Wu |
| 10,175,660 | B2 | 1/2019 | Kanayama |
| 10,186,094 | B2 | 1/2019 | Wu |
| 10,209,090 | B2 | 2/2019 | Luke |
| 10,345,843 | B2 | 7/2019 | Luke |
| 2008/0183361 | A1* | 7/2008 | Oyama ................ B60L 3/0092 |
| | | | 701/99 |
| 2012/0212183 | A1 | 8/2012 | Yamada |
| 2013/0026971 | A1 | 1/2013 | Luke |
| 2013/0030580 | A1 | 1/2013 | Luke |
| 2013/0030581 | A1 | 1/2013 | Luke |
| 2013/0030608 | A1 | 1/2013 | Taylor |
| 2013/0030630 | A1 | 1/2013 | Luke |
| 2013/0030920 | A1 | 1/2013 | Wu |
| 2013/0033203 | A1 | 2/2013 | Luke |
| 2013/0116892 | A1 | 5/2013 | Wu |
| 2014/0047255 | A1* | 2/2014 | Sasaki ..................... H04L 41/06 |
| | | | 713/323 |
| 2014/0142786 | A1 | 5/2014 | Huang |
| 2014/0152261 | A1* | 6/2014 | Yamauchi ............ G01R 31/396 |
| | | | 320/118 |
| 2014/0251710 | A1 | 9/2014 | Juan |
| 2014/0253021 | A1 | 9/2014 | Luke |
| 2014/0266006 | A1 | 9/2014 | Luke |
| 2014/0277844 | A1 | 9/2014 | Luke |
| 2014/0279576 | A1 | 9/2014 | Luke |
| 2015/0035492 | A1* | 2/2015 | Nomura ................ H02J 7/0016 |
| | | | 320/126 |
| 2015/0042157 | A1 | 2/2015 | Chen |

OTHER PUBLICATIONS

Decision to Grant a Patent issued for counterpart Japanese Application No. 2017-058612, drafted by the Japan Patenl Office dated Feb. 19, 2018.

Office Action issued for counterpart Japanese Application No. 2017-058612, drafted by the Japan Patent Office on dated Dec. 6, 2017.

* cited by examiner

| STATE | THRESHOLD OF NUMBER OF SIGNALS PER UNIT TIME |
|---|---|
| LID OF HOUSING UNIT IS OPEN | N1 |
| NO BATTERY IS MOUNTED ON CHARGER | N2 |
| BATTERY IS MOUNTED ON CHARGER AND CHARGING CURRENT IS ZERO | N3 |
| BATTERY IS MOUNTED ON CHARGER AND CHARGING CURRENT IS NOT MORE THAN 10% OF PRESCRIBED VALUE | N4 |

CHARGE CONTROL DEVICE AND COMPUTER READABLE STORAGE MEDIUM

CROSS REFERENCE TO RELATED APPLICATION

The contents of the following Japanese patent application and international application are incorporated herein by reference:
Japanese Application 2017-058612 filed on Mar. 24, 2017
International Application PCT/JP2018/010911 filed on Mar. 19, 2018.

BACKGROUND

1. Technical Field

The present invention relates to a charge control device and a computer readable storage medium.

2. Related Art

There is known a control device including one or more slave side control devices that control charge and discharge of a battery module, and a master side control device that outputs an instruction signal of charge and discharge of the battery module to the slave side control device (see Patent Literature 1).
Patent Literature 1: Japanese Patent Application Publication No. 2012-85494

BRIEF DESCRIPTION OF THE DRAWINGS

FIG. 3 schematically illustrates an example of the internal configuration of a control unit 110a.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention. In the drawings, the same or similar portions may be denoted by the same reference numerals and may not be described repeatedly.

Figure 1:
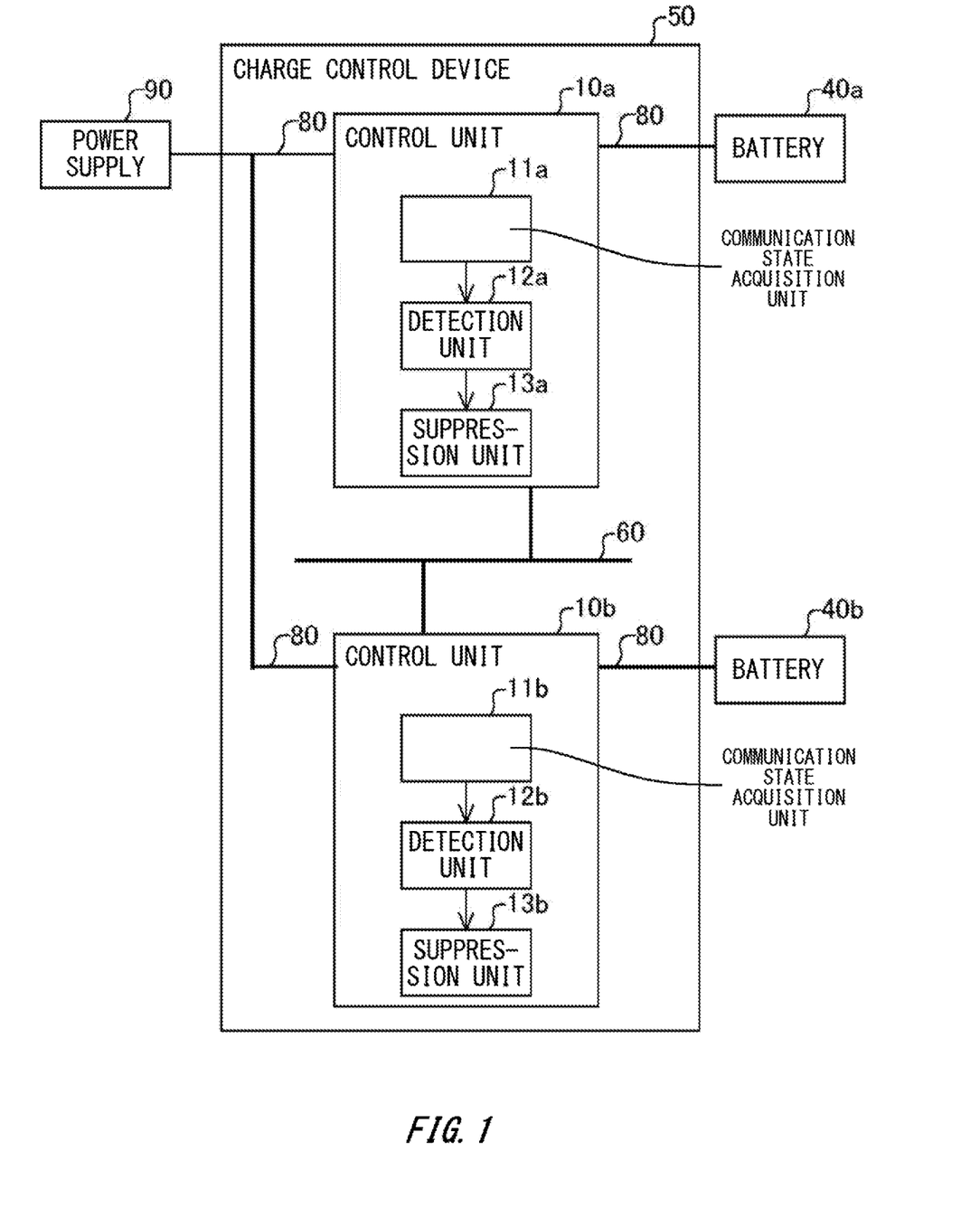
FIG. 1 schematically illustrates an example of a system configuration of a charge control device 50.

FIG. 1 schematically illustrates an example of a system configuration of a charge control device 50. FIG. 1 illustrates a power supply 90, a battery 40a, and a battery 40b, as well as the charge control device 50. In the present embodiment, the charge control device 50 includes a control unit 10a, a control unit 10b, a communication line 60, and a power line 80. The control unit 10a includes a communication state acquisition unit 11a, a detection unit 12a, and a suppression unit 13a. The control unit 10b includes a communication state acquisition unit 11b, a detection unit 12b, and a suppression unit 13b.

The charge control device 50 controls charging of the battery 40a and the battery 40b. The battery 40a and the battery 40b are secondary batteries such as a lithium ion battery, a nickel hydrogen battery, or a lead storage battery.

The battery 40a and the battery 40b are attachable to and detachable from the charge control device 50. The battery 40a and the battery 40b can be mounted on a vehicle. The battery 40a and the battery 40b are removed from the vehicle and mounted on the charge control device 50. The charge control device 50 charges the mounted batteries 40a and 40b. The battery 40a and the battery 40b charged by the charge control device 50 are removed from the charge control device 50 and mounted on the vehicle.

The vehicle is an example of an apparatus that operates with the power of the battery 40a and the battery 40b. The vehicle is, for example, an electric motorcycle. The battery 40a and the battery 40b mounted on the electric motorcycle supply power to the electric motorcycle. The electric motorcycle travels by converting the electrical energy supplied from the battery 40a and the battery 40b into motive power. The electric motorcycle may drive electric devices provided in the electric motorcycle using the electrical energy supplied from the battery 40a and the battery 40b.

The vehicle is not limited to an electric motorcycle. The vehicle may be an electric bicycle, a motorcycle, or a four-wheeled motor vehicle. The battery 40a and the battery 40b may be installed in various transport apparatuses, without being limited to a vehicle. The battery 40a and the battery 40b can be applied for various devices operated by electric power, without being limited to a transportation device.

The control unit 10a and the control unit 10b are connected to each other by a communication line 60. The communication line 60 is a communication network such as a controller area network (CAN).

The control unit 10a and the control unit 10b control charging of different batteries. Specifically, the control unit 10a controls charging of the battery 40a. The control unit 10b controls charging of the battery 40b. The control unit 10a may receive information from the battery 40a through the power line 80. The control unit 10a may transmit information to the battery 40a through the power line 80. The control unit 10b may receive information from the battery 40b through the power line 80. The control unit 10b may transmit information to the battery 40b through the power line 80.

In the control unit 10a, the communication state acquisition unit 11a acquires the communication state of the control unit 10b through the communication line 60. The detection unit 12a detects an abnormality in the control unit 10b based on the communication state of the control unit 10b acquired by the communication state acquisition unit 11a. The suppression unit 13a suppresses the operation of the control unit 10b for which an abnormality is detected by the detection unit 12a.

For example, the communication state acquisition unit 11a acquires the communication amount of the control unit 10b. The communication state acquisition unit 11a reads identification information of a transmission source device from a signal transmitted on the communication line 60. The control unit 10a acquires the number of signals transmitted from the control unit 10b based on the identification information of the transmission source device. The detection unit 12a determines that the control unit 10b is abnormal when the communication amount of the control unit 10b acquired by the communication state acquisition unit 11a exceeds a predetermined value. When the control unit 10b is determined as abnormal, the suppression unit 13a transmits a signal to stop the control unit 10b through the communication line 60.

The control unit 10b operates in the same manner as that of the control unit 10a. Specifically, in the control unit 10b, the communication state acquisition unit 11b acquires the communication state of the control unit 10a through the communication line 60. The detection unit 12b detects an abnormality of the control unit 10a based on the communication state of the control unit 10a acquired by the communication state acquisition unit 11b. The suppression unit 13b suppresses the operation of the control unit 10a for which an abnormality is detected by the detection unit 12b.

With the charge control device 50, the control unit 10a and the control unit 10b mutually monitor the communication amount to mutually detect the abnormality. Accordingly, when the abnormality occurs in one of the control unit 10a and the control unit 10b, it is possible to suppress the occurrence of control failure of the entire charge control device 50. For example, even when the control unit 10b is illegally accessed from the outside through the power line connected to the battery 40b, the control unit 10a can detect the abnormal behavior of the control unit 10b caused by the unauthorized access. Then, the control unit 10a can stop the operation of the control unit 10b. Accordingly, the charge control device 50 can maintain the function of charging the battery 40a.

Each part of control unit 10a may be embodied by hardware, software, or hardware and software. When at least some of the components constituting the control unit 10a are embodied by software, the components embodied by the software may be implemented by activating software or a program that defines the operations related to the corresponding components in a typically configured information processing apparatus. The information processing apparatus described above includes (i) a data processing device including a processor such as a CPU or GPU, a ROM, a RAM, a communication interface, and so on, (ii) a keyboard, a touch panel, a camera, a microphone, various sensors, a GPS receiver, and so on, (iii) an output device such as a display device, a speaker, or a vibration device, and (iv) a memory, a storage device such as an HDD (including an external storage device). In the information processing apparatus described above, the data processing apparatus or storage device may store the software or the program. The above software or program is executed by the processor to cause the above information processing apparatus to execute an operation defined by the software or program. The above software or program may be stored in a non-transitory computer readable recording medium.

The above software or program may be a control program for controlling the control unit 10a. The control program causes, for example, the computer to execute a communication state acquisition procedure for acquiring the communication state of the control unit 10b through the communication line 60. The control program causes the computer to execute a detection procedure for detecting the abnormality of the control unit 10b based on the communication state of the control unit 10b acquired by the communication state acquisition procedure. The control program causes the control unit 10a to execute a suppression procedure for suppressing the operation of the control unit 10b for which an abnormality is detected by the detection procedure.

The control unit 10b may be embodied in the same configuration as that of the control unit 10a. The control program causes, for example, the computer to execute a communication state acquisition procedure for acquiring the communication state of the control unit 10a through the communication line 60. The control program causes the computer to execute a detection procedure of detecting an abnormality of the control unit 10a based on the communication state of the control unit 10a acquired by the communication state acquisition procedure. The control program causes the computer to execute a suppression procedure for suppressing the operation of the control unit 10a for which an abnormality is detected by the detection procedure.

The above computer may function as the control unit 10a and the control unit 10b. The above computer may be a processing device such as a processor that executes the function of the control unit 10a. The above computer may further include a processing device such as a processor that executes the function of the control unit 10b.

Figure 2:
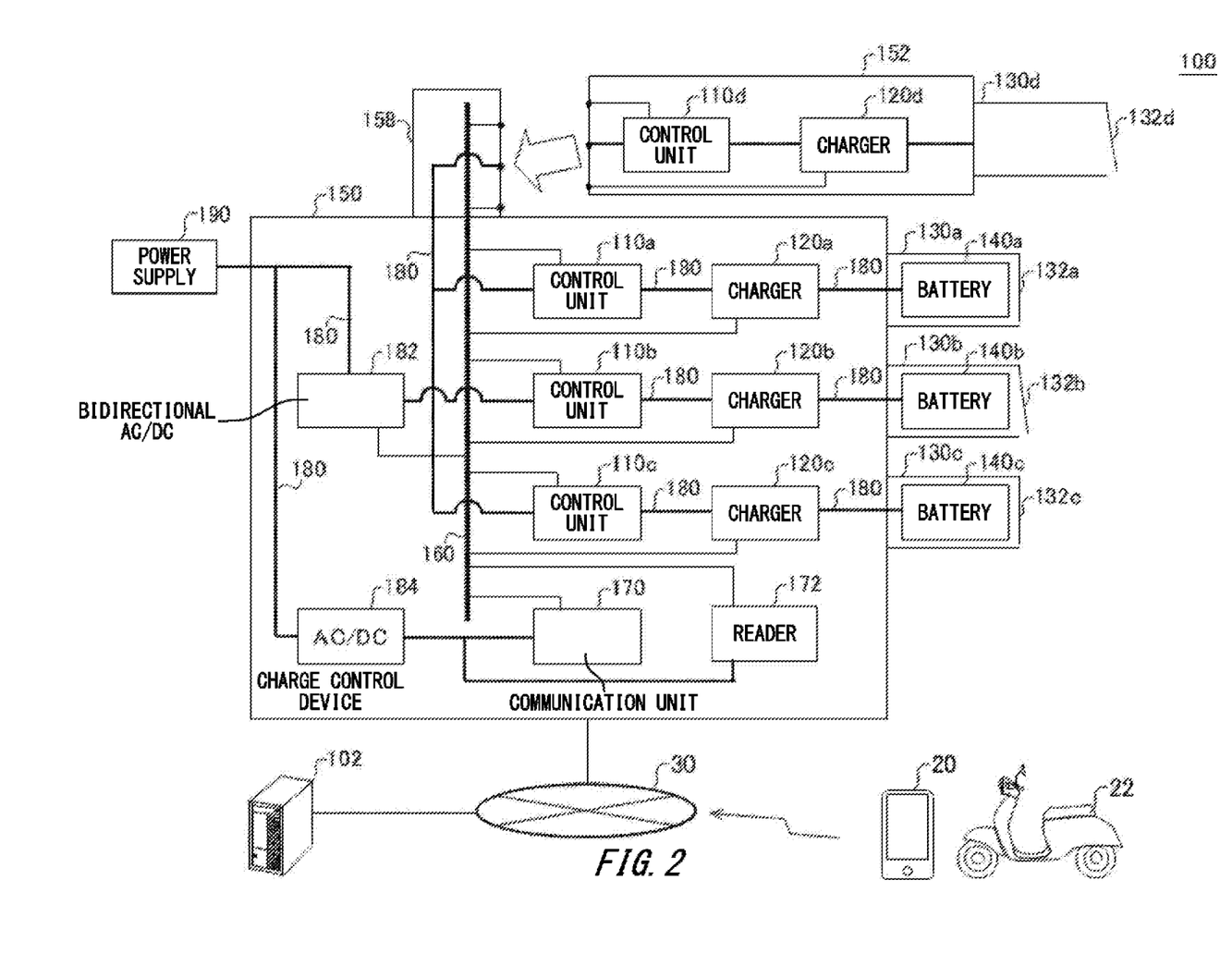
FIG. 2 schematically illustrates an example of the overall configuration of a charging system 100.

FIG. 2 schematically illustrates a configuration example of an entire charging system 100. The outline of the charging system 100 will be described with reference to FIG. 2. The charging system 100 includes a charge control device 150 and a server 102.

The charge control device 150 charges a battery 140a, a battery 140b, and a battery 140c using the electrical energy supplied from the power supply 190. The power supply 190 is, for example, a power supply system or a power generation device. The power generation device may include a natural energy power generation device.

The battery 140a, the battery 140b, and the battery 140c are separate batteries. The battery 140a, the battery 140b, and the battery 140c may be collectively referred to as a battery 140. The battery 140 is a secondary battery such as a lithium ion battery, a nickel hydrogen battery, or a lead storage battery. The battery 140 is attachable to and detachable from the charge control device 150. The battery 140 is mounted on the electric motorcycle 22 used by the user.

The charge control device 150 communicates with the server 102 via a communication network 30. The server 102 communicates with a user terminal 20 via the communication network 30. The charge control device 150 constitutes at least a part of a battery station for providing the electric motorcycle 22 with a replacement battery 140.

For example, the charge control device 150 controls the charging of the battery 140 to constantly provide the battery 140 in a full charged state. The charge control device 150 provides the user terminal 20 with information such as the number of batteries in the full charged state via the server 102 and the network 30.

An operation of the charging system 100 is schematically described. A user holds the charging system user card or the user terminal 20 of the charging system over the charge control device 150 at the battery station. The charge control device 150 reads user information from the user card or the user terminal 20. The charge control device 150 transmits user information to the server 102 to authenticate the user. After the authentication of the user, the user mounts the after-use battery 140a removed from the electric motorcycle 22 in the charge control device 150. The user takes out the battery 140 in the full charged state from the charge control device 150 and mounts the battery 140 on the electric motorcycle 22. When the battery 140 is removed from the charge control device 150, the charge control device 150 transmits the user information and the replacement information of the battery 140 to the server 102. Accordingly, the user who has replaced the battery is subject to billing. The charge control device 150 charges the attached battery 140.

The communication network 30 may include a transmission path of wired communication, or may include a transmission path of wireless communication. The communication network 30 may include a wireless packet communication network, the Internet, a P2P network, a dedicated line, a VPN, a power line communication line, and the like. The communication network 30 may include (i) a mobile communication network such as a mobile telephone network, and (ii) a wireless MAN (e.g., WiMAX (registered trademark)), a wireless LAN (e.g., WiFi (registered trademark)), Bluetooth (registered trademark), Zigbee (registered trademark), and wireless communication networks such as Near Field Communication (NFC).

In the present embodiment, the user terminal 20 is a communication terminal used by a user. The details of the user terminal 20 are not particularly limited. Examples of the user terminal 20 include a personal computer, a portable terminal, and so on. Examples of the portable terminal include a mobile phone, a smart phone, a PDA, a tablet, a notebook computer or a laptop computer, a wearable computer, and so on.

As illustrated in FIG. 2, the charge control device 150 includes a control unit 110*a*, a control unit 110*b*, a control unit 110*c*, a charger 120*a*, a charger 120*b*, a charger 120*c*, and bidirectional AC/DC 182, an AC/DC 184, a communication unit 170, a reader 172, a housing unit 130*a*, a housing unit 130*b*, and a housing unit 130*c*.

The control unit 110*a*, the control unit 110*b*, and the control unit 110*c* may be collectively referred to as a control unit 110. The charger 120*a*, the charger 120*b*, and the charger 120*c* may be collectively referred to as a charger 120. The housing unit 130*a*, the housing unit 130*b*, and the housing unit 130*c* may be collectively referred to as a housing unit 130.

AC power is supplied from the power supply 190 to the charge control device 150. The AC power supplied from the power supply 190 is supplied to the bidirectional AC/DC 182 and the AC/DC 184 via the power line 180.

The bidirectional AC/DC 182 generates power for operating the control unit 110 and the charger 120 and power for charging the battery 140. Specifically, the bidirectional AC/DC 182 converts the AC power supplied from the power supply 190 into the DC power. The DC power converted by the bidirectional AC/DC 182 is supplied to the control unit 110*a*, the control unit 110*b*, and the control unit 110*c* via the power line 180. The control unit 110*a* supplies the supplied DC power to the battery 140*a* via the power line 180 and the charger 120*a* to charge the battery 140*a*. The control unit 110*b* supplies the supplied DC power to the battery 140*b* via the power line 180 and the charger 120*b* to charge the battery 140*b*. The control unit 110*c* supplies the supplied DC power to the battery 140*c* via the power line 180 and the charger 120*c* to charge the battery 140*c*.

The charge control device 150 can execute reverse power flow to the power supply 190 side. If the power on the power supply 190 side is insufficient, the charge control device 150 supplies, for example, the DC power supplied from the battery 140*a* via the charger 120*a* to the bidirectional AC/DC 182. The bidirectional AC/DC 182 converts the supplied DC power into AC power and supplies the converted AC power toward the power supply 190.

The AC/DC 184 generates power for the operation of communication unit 170 and reader 172. Specifically, the AC/DC 184 converts AC power supplied from the power supply 190 via the power line 180 into DC power. The DC power converted by the bidirectional AC/DC 182 is supplied to the communication unit 170 and the reader 172.

The control unit 110*a*, the control unit 110*b*, the control unit 110*c*, the sensors provided in the charger 120*a*, the charger 120*b*, and the charger 120*c*, the communication unit 170, the reader 172, and the bidirectional AC/DC 182 are connected to each other by a communication line 160. The communication line 160 may be a communication network such as CAN.

The reader 172 reads user information from the user card or the user terminal 20. The communication unit 170 sends user information to the server 102 to authenticate the user. Further, the communication unit 170 transmits the information acquired from the control unit 110*a*, the control unit 110*b*, the control unit 110*c*, and the bidirectional AC/DC 182 through the communication line 160 to the server 102. Further, the communication unit 170 provides the information acquired from the server 102 to the control unit 110*a*, the control unit 110*b*, and the control unit 110*c* via the communication line 160.

The control unit 110*a*, the control unit 110*b*, and the control unit 110*c* each control charging of individual batteries. Specifically, the control unit 110*a* controls charging of the battery 140*a*. The control unit 110*b* controls charging of the battery 140*b*. The control unit 110*c* controls charging of the battery 140*c*.

Specifically, the charger 120 is provided in association with control unit 110. The charger 120 charges different batteries 140. Specifically, the charger 120*a* is provided in association with the control unit 110*a* to charge the battery 140*a*. The charger 120*b* is provided in association with the control unit 110*b* to charge the battery 140*b*. The charger 120*c* is provided in association with the control unit 110*c*, and charges the battery 140*c*. The control unit 110 controls a corresponding charger 120 of the chargers 120 to control charging of the battery 140 mounted on the corresponding charger 120. Thus, the chargers 120 which are mutually independent from each other are each controlled by the dedicated control unit 110.

Each control unit 110 is connected to the battery 140 connected to the corresponding charger 120 of the chargers 120 via the power line 180 that supplies power for charging the battery 140, and communicates with the battery 140 mounted on the corresponding charger 120 via the power line 180.

The battery 140 is attachable to and detachable from the charger 120. A lid 132 is provided for each housing unit 130. The lid 132 can be closed when the battery 140 is stored in the housing unit 130 and the terminal of the battery 140 is connected to the terminal of the charger 120*a*.

The charge control device 150 includes a mounting unit 158 on which a charging unit 152 can be mounted. The charging unit 152 is, for example, a charging unit for expansion. The charging unit 152 includes a charger 120*d* for charging the battery, a control unit 110*d* for controlling the charger 120, and a housing unit 130*d*. When the charging unit 152 is mounted on the mounting unit 158, the control unit 110*d* included in the charging unit 152 is connected to the communication line 160. Further, when the charging unit 152 is mounted on the mounting unit 158, the control unit 110*d* included in the charging unit 152 is connected to the power line 180.

Herein, the control unit 110a, the control unit 110b, the control unit 110c, and the control unit 110d are collectively referred to as the control unit 110. Before each control unit 110 starts communication with other control units 110 through the communication line 160 after activation, the control unit 110 extracts an ID or IDs of other one or more control units 110 from signals transmitted through the communication line 160, determines an ID which is different from other IDs of the other one or more control units 110 as its own ID, and sends out the signal having the determined ID to the communication line 160. Similarly, the sensors included in the chargers 120 may determine IDs which are different from the other one or more IDs of the sensors as its own IDs.

Accordingly, it is not necessary to set in advance an ID for communication in the control unit 110d of the charging unit 152 and the sensor of the charger 120d. Further, the control unit 110d of the charging unit 152 can be manufactured with the same specification as the control specification of the control unit 110 of the charge control device 150. Further, it is possible to manufacture the sensor of the charger 120d of the charging unit 152 with the same specification as the control specification of the sensor of the charger 120 of the charge control device 150. Further, it is not necessary to add setting information regarding the charging unit 152 to the control logic of the charge control device 150.

The details of the operation of the control unit 110a will be described with reference to FIG. 3.

Figure 3:
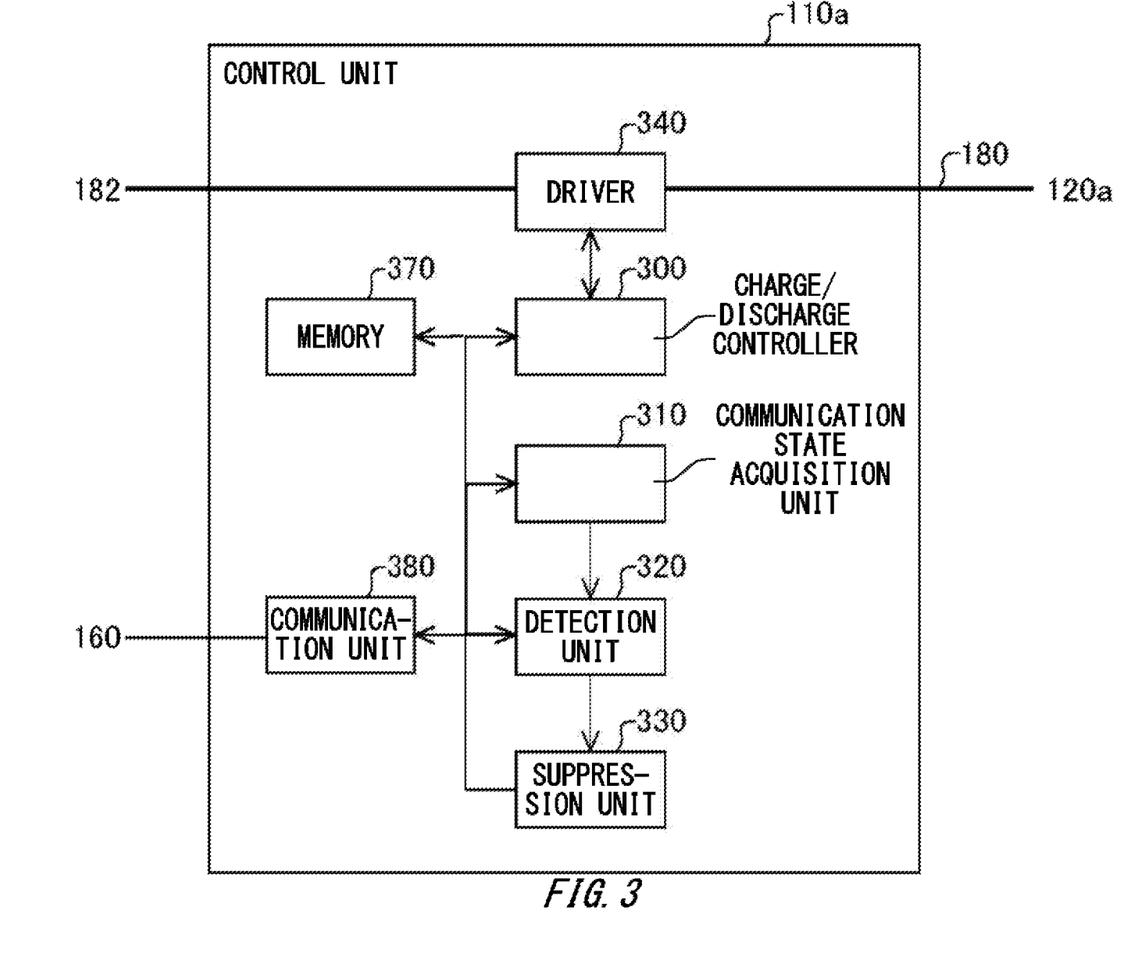

FIG. 3 schematically illustrates an example of the internal configuration of the control unit 110a. The control unit 110a includes a communication state acquisition unit 310, a detection unit 320, a suppression unit 330, a charge/discharge controller 300, a driver 340, a communication unit 380, and a memory 370.

The control units 110 other than the control unit 110a also have the same internal configuration as that of the control unit 10a. Therefore, the description of the internal configuration of the control unit 110 other than the control unit 110a may be omitted. The control unit 110 other than the control unit 110a may be described as having the same function as that of the control unit 10a.

The communication unit 380 is responsible for communication via the communication line 160. The communication unit 380 acquires a signal transmitted on the communication line 160. The control unit 110a performs various kinds of control based on the information included in the signal acquired by the communication unit 380.

The memory 370 stores information used for the operation in the control unit 110a. The memory 370 may be a temporary storage medium.

When transmitting information through the communication line 160, the communication unit 380 generates a signal including the information and the ID of the control unit 110a, and transmits the signal through the communication line 160. The ID of the control unit 110a is an example of identification information of the control unit 110a. When the CAN or CAN extended specification is used as the communication line 160, the ID of the control unit 110a may be an "ID" conforming to the CAN or extended CAN specification.

The charge/discharge controller 300 mainly controls the driver 340. The driver 340 generates power for charging the battery 140a from the power supplied from the bidirectional AC/DC 182. The charge/discharge controller 300 controls the driver 340 to control the charge amount of the battery 40a by the charger 120a. In the case of the reverse power flow to the power supply 190 side, the charge/discharge controller 300 may control the driver 340 to control the discharge amount of the battery 40a.

Further, the driver 340 is responsible for communication with the battery 140a through the power line 180. The charge/discharge controller 300 acquires information from the battery 140a through the driver 340 and the power line 180. The charge/discharge controller 300 transmits the signal to inquire information stored in the battery 140a through the driver 340 and the power line 180. The charge/discharge controller 300 acquires the information stored in battery 140a through the power line 180 and driver 340.

The communication state acquisition unit 310 acquires the communication state of another control unit 110 of the control unit 110 through the communication line 160. The detection unit 320 detects an abnormality in the other control unit 110 based on the communication state of the other control unit 110 acquired by the communication state acquisition unit 310. The suppression unit 330 suppresses the operation of the other control unit 110 whose abnormality is detected by the detection unit 320.

For example, based on the ID of the transmitting source of the signal acquired by the communication unit 380, the communication state acquisition unit 310 counts the number of signals transmitted from each of the control unit 10b and the control unit 10c. For example, the communication state acquisition unit 310 associates the ID of the signal received through the communication line 160 with the reception time, and stores the ID in the memory 370.

The communication state acquisition unit 310 calculates the number of signals per unit time transmitted from each of the control unit 110b and the control unit 110c based on the counted number of signals. For example, when the number of signals per unit time from the control unit 10c calculated by the communication state acquisition unit 310 exceeds a predetermined value, the detection unit 320 determines that the control unit 10c is abnormal. The suppression unit 13a transmits, via the communication line 160, a signal to stop the control unit 110c in which the abnormality is determined.

Each charger 120 includes a sensor for detecting information on the battery 140. The output of each sensor is transmitted through the communication line 160. The control units 110 individually acquire outputs of the sensors included in the chargers 120 through the communication line 160.

For example, each charger 120 includes a sensor for detecting the mounting state of the battery 140 on the charger 120. In the control unit 110, the detection unit 320 detects the abnormality of other control units 110 based on the communication state of other control units 110 and the outputs of the sensors of the chargers 120 corresponding to other control units 110.

Specifically, each sensor of the chargers 120 detects whether the battery 140 is mounted on each charger 120. In a case where the battery 140 is not mounted on the charger 120 of other control units 110, and the communication amount of other control units 110 exceeds a predetermined amount, the detection unit 320 determines that the abnormality occurs in other control units 110.

Further, each charger 120 includes a sensor to detect an open/close state of the lid 132 of the housing unit 130 that stores the corresponding battery 140. When the lid of the charger 120 corresponding to each control unit of other control units 110 is open, and the communication amount of the corresponding control unit 110 exceeds a predetermined amount, the detection unit 320 detects occurrence of the abnormality in the other control unit 110.

Each sensor of the charger 120a detects the amount of current supplied from the charger 120 to the battery 140. In a case where the amount of the electric current through the charger 120 is smaller than a predetermined value, and the communication amount of other control units 110 exceeds the predetermined amount, the detection unit 320 detects occurrence of the abnormality in the control unit 110.

Further, if each control unit 110 detects an abnormality in another control unit 110, the control unit 110 reports information of the detection of the abnormality in the other control unit 110 to the corresponding control unit 110 via the communication line 160. The suppression unit 330 suppresses the operation of the control units 110 for which an abnormality is detected, if the abnormality is detected by a number of control units 110 that exceeds a predetermined number (two or more).

For example, when the detection unit 320 detects an abnormality in another control unit 110, the communication unit 380 transmits, via the communication line 160, information of detection of the abnormality of the other control unit 110. Similarly, in other control units 110, the information of occurrence is sent via the communication line 160. The suppression unit 330 suppresses the operation of the control units 110 for which an abnormality is detected, if the abnormality is detected by a number of control units 110 that exceeds a predetermined number (two or more).

According to the charge control device 150, the plurality of control units 110 mutually detect abnormality. Accordingly, when the abnormality occurs in any one of the control units 110, it is possible to suppress the occurrence of the overall control failure of the charge control device 150. For example, even when the control unit 110b is hacked through the power line connected to the battery 140b, at least one of the control unit 110a and the control unit 110c can detect the abnormality in the control unit 110b caused by the hacking. Then, at least one of the control unit 110a and the control unit 110c can stop the operation of the control unit 110b. Accordingly, a portion of the functions of the charge control device 150 can be maintained normally.

Figure 4:
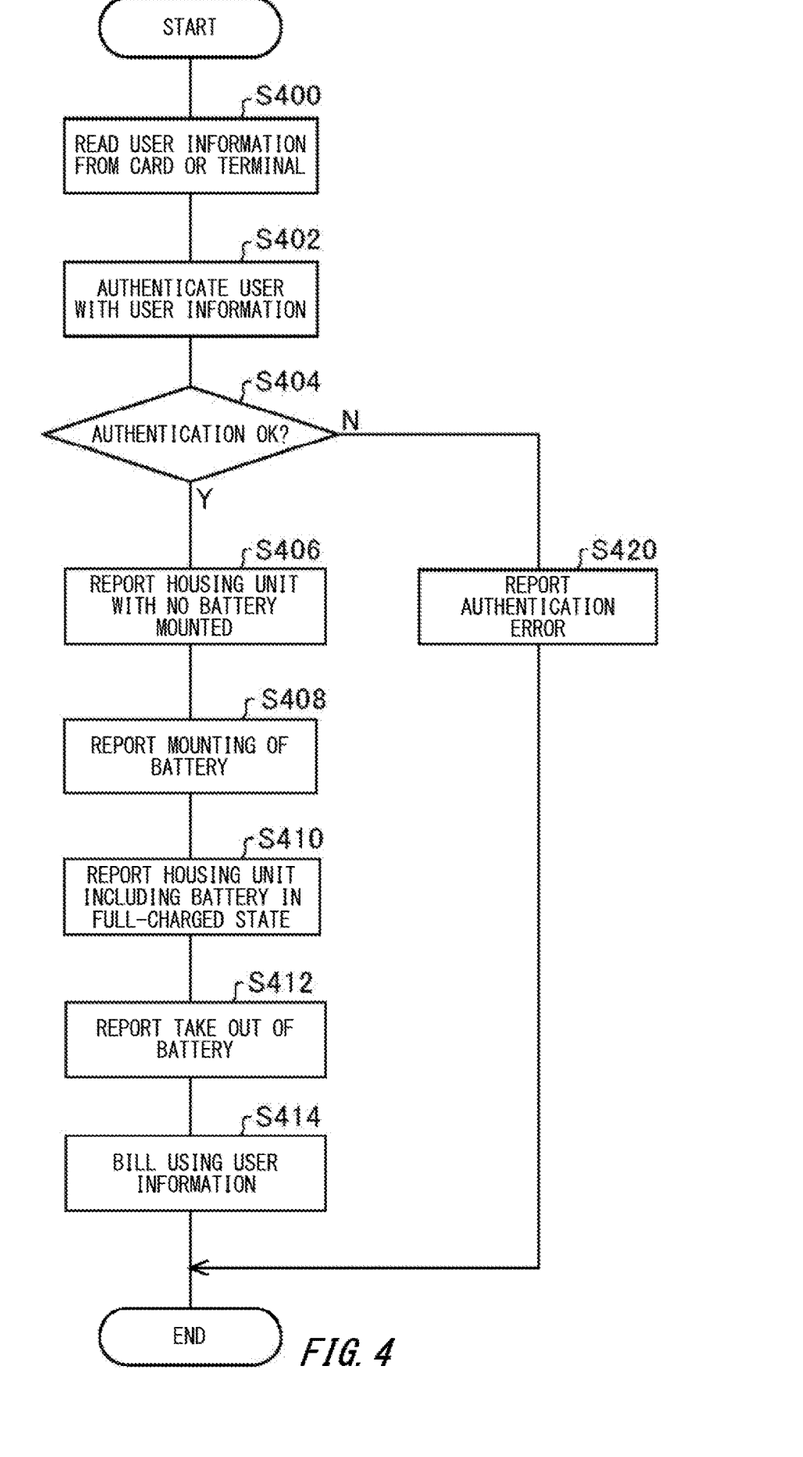
FIG. 4 is a flowchart illustrating processing relating to battery replacement in the charging system 100.

FIG. 4 is a flowchart of processing related to battery replacement in the charging system 100. The processing of this flowchart starts when the user holds the user card or the user terminal 20 over the reader 172.

In S400, the reader 172 reads user information from the user card or the user terminal 20.

In S402, the user is authenticated using the user information. For example, the communication unit 170 transmits the user information to the server 102 through the network 30. The server 102 authenticates the user using the received user information. The server 102 transmits the authentication result of the user to the charge control device 150 through the network 30.

In S404, it is determined whether the user authentication has been succeeded. If the user authentication is not succeeded, an authentication error is reported to the user in S420. For example, the server 102 may transmit a message of unsuccessful user authentication to the user terminal 20 through the network 30. Further, when the communication unit 170 receives the unsuccessful user authentication result, it is possible to report the authentication result to the user by blinking an alert lamp in the charge control device 150.

If the user can be authenticated, in S406, the housing unit 130 with no battery mounted is reported to the user. For example, when the control unit 110 receives a signal indicating that the user has been authenticated, the control unit 110 determines whether the battery 140 is mounted on the corresponding housing unit 130. When the battery 140 is not mounted on the corresponding housing unit 130, the control unit 110 may report that fact to the user by blinking a lamp provided in the corresponding housing unit 130.

In S408, when the battery 140 is mounted on the housing unit 130, the control unit 110 corresponding to the housing unit 130 on which the battery 140 is mounted transmits a signal indicating that a used battery is mounted through the communication line 160.

In S410, the housing unit 130 including the battery 140 in the full-charged state is reported to the user. For example, when the control unit 110 receives the signal indicating that the used battery 140 is mounted, the control unit 110 determines whether the battery 140 in the full charged state is mounted on the corresponding housing unit 130. When the battery 140 in the full charged state is mounted on the corresponding housing unit 130, the control unit 110 may report that fact to the user by blinking a lamp provided in the corresponding housing unit 130.

In S412, when the battery 140 is taken out from the housing unit 130, the corresponding control unit 110 transmits a signal indicating that the battery in the full charged state has been removed through the communication line 160.

In S414, the control unit 110 transmits, via the communication line 160, a signal indicating that billing is requested to the user. Upon receipt of the signal, the communication unit 170 transmits the information for requesting billing to the server 102 through the network 30.

Figure 5:
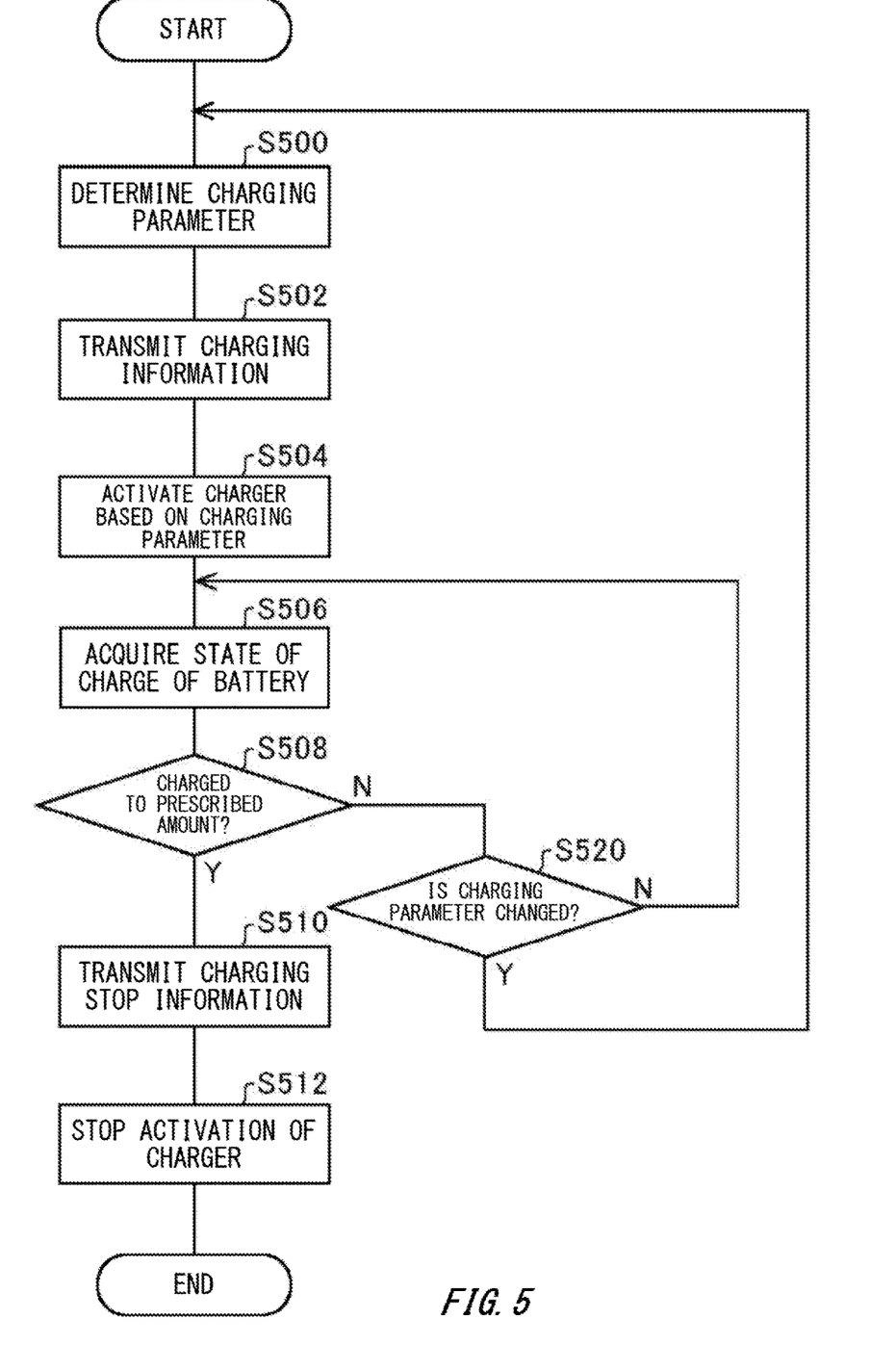
FIG. 5 is a flowchart illustrating processing relating to battery charging in a charge control device 150.

FIG. 5 is a flowchart of processing related to charging of the battery in the charge control device 150. The processing of this flowchart starts when a signal indicating that the battery 140 is mounted on the battery 40 is received from the charger 120.

In S500, the control unit 110 determines a charging parameter for charging the battery 140. For example, the charge/discharge controller 300 of the control unit 110 determines a charging voltage, a charging current, and the like.

In S502, the control unit 110 transmits the charge information to the communication line 160. For example, the communication unit 380 of the control unit 110 determines the power to be additionally supplied to the control unit 110 based on the charging parameter, and transmits a signal including information indicating the power via the communication line 160. When the bidirectional AC/DC 182 receives the signal through the communication line 160, the bidirectional AC/DC 182 may increase the power that can be supplied to the control unit 110 side.

In S504, the charger 120 is driven based on the charging parameter determined in S500. For example, the charge/discharge controller 300 controls the driver 340 based on the charging parameters determined in S500 to drive the charger 120.

In S506, the control unit 110 acquires the charge state of the battery 140. For example, the charger 120 transmits information such as a terminal voltage, a charging current, and the like of the battery 140 through the communication line 160. In the control unit 110, the charge/discharge controller 300 calculates the charge state of the battery 140 based on the terminal voltage, the charging current, and the like of the battery 140. The charge state of the battery 140 may correspond to an SOC of the battery 140.

In S508, the control unit 110 determines whether the battery 140 has been charged to a prescribed amount. For example, the charge/discharge controller 300 determines whether the SOC of the battery 140 has reached the SOC that can be determined as the full charge.

If the battery 140 has not been charged to the prescribed amount, the control unit 110 determines in S520 whether the charging parameter should be changed. For example, when it is determined that the charge current needs to be reduced based on the charge state of the battery 140, the charge/discharge controller 300 determines to change the charging parameter.

If it is determined in S520 that the charging parameter is not to be changed, the process proceeds to S506. If it is determined in S520 that the charging parameter is to be changed, the process proceeds to S500.

If it is determined in S508 that the battery 140 has been charged to the prescribed amount, the control unit 110 transmits information indicating that charging is to be stopped in S510. For example, the communication unit 380 of the control unit 110 transmits, via the communication line 160, information indicating that charging is to be stopped. When the bidirectional AC/DC 182 receives the signal through the communication line 160, it may reduce the power that can be supplied to the control unit 110 side.

At S512, the control unit 110 stops driving of the charger 120. For example, the charge/discharge controller 300 controls the driver 340 to stop the power supplied to the charger 120.

Figure 6:
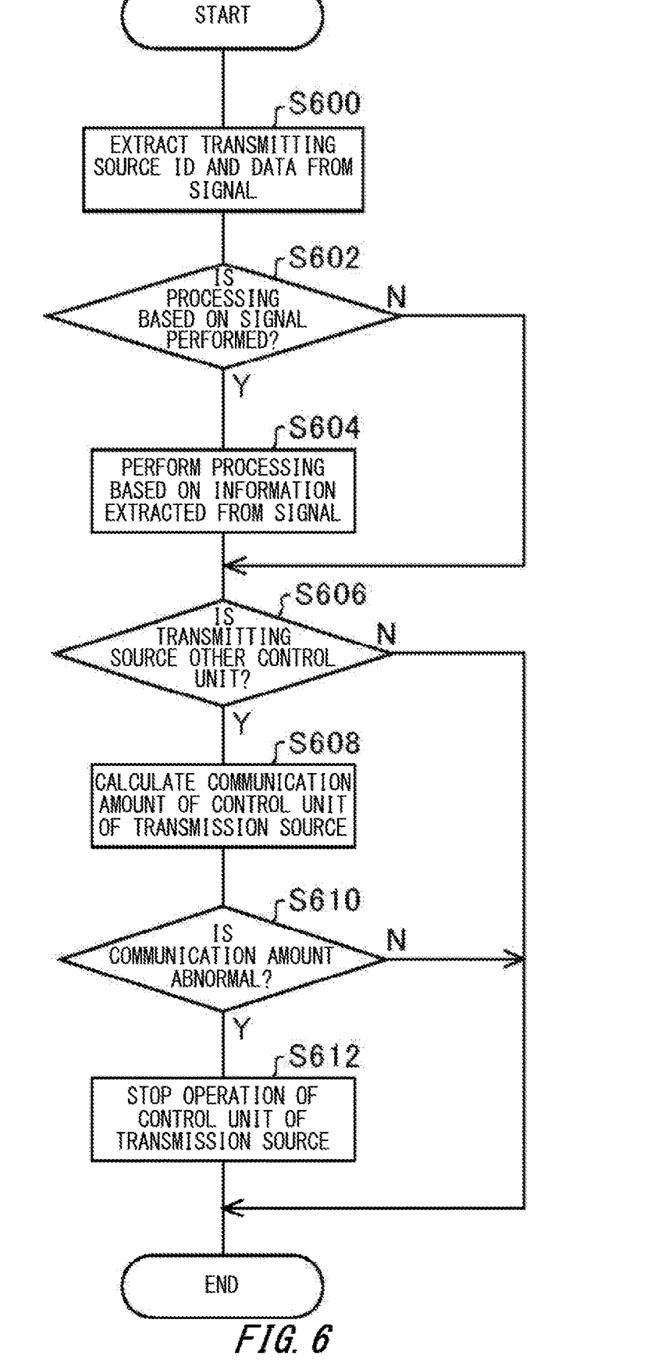
FIG. 6 is a flowchart illustrating processing related to abnormality detection of control unit 110 in the charge control device 150.

FIG. 6 is a flowchart illustrating processing related to abnormality detection of the control unit 110 in the charge control device 150. The process of this flowchart is started when a signal is received through the communication line 160.

In S600, the control unit 110 extracts, from the signal transmitted through the communication line 160, the ID and data indicating the device of the transmission source. Specifically, the communication unit 380 of the control unit 110 extracts the ID and data from the signal.

In step S602, the control unit 110 determines whether the processing is to be performed based on the signal. For example, when the signal is sensor information from the corresponding charger 120, the communication unit 380 determines that processing based on the signal is to be performed. On the other hand, when the destination of the signal is a device other than the control unit 110 of its own, it is determined that the processing based on the signal is not to be performed. If it is determined that processing based on the received signal is to be performed, processing is performed based on the information extracted from the signal in S604, and the process proceeds to S606. If it is determined in S602 that processing based on the received signal is not to be performed, the process proceeds to S606.

In S606, it is determined whether the transmission source of the received signal is another control unit 110. For example, when the ID of the received signal matches the ID of another control unit 110, the communication unit 380 determines that the transmission source of the received signal is the other control unit 110. If the transmitting source of the received signal is not the other control unit 110, the processing of this flowchart ends.

If the transmitting source of the received signal is another control unit 110, the communication state acquisition unit 310 calculates the communication amount of the control unit 110 of the transmission source in S608. Specifically, based on the reception history of the signal stored in the memory 370 in association with the ID of the control unit 110 of the transmitting source, the communication state acquisition unit 310 is within a time range up to a predetermined time before the present. The number of signals transmitted by the control unit 110 of the transmission source is calculated. The communication state acquisition unit 310 calculates the number of signals per unit time based on the number of signals and the predetermined time.

In S610, it is determined whether the communication amount calculated in S608 is abnormal. For example, when the communication amount calculated in S608 exceeds a predetermined threshold, the detection unit 320 determines that the communication amount is abnormal. The detection unit 320 determines that the communication amount is not abnormal when the communication amount calculated in S608 is equal to or smaller than a predetermined threshold. The threshold will be described later.

If it is determined in S610 that the communication amount is not abnormal, the processing of this flowchart ends. If it is determined in S610 that the communication amount is abnormal, the operation of the control unit 110 of the transmission source is stopped in S612. For example, the suppression unit 330 transmits a signal to stop the operation of the control unit 110 to the control unit 110 via the communication line 160. Accordingly, it is possible to prevent the spread of abnormality occurring in the control unit 110 to the entire charge control device 150.

If the specific control unit 110 is determined as abnormal in S612, the communication unit 380 may transmit a signal indicating that the specific control unit 110 is determined as abnormal via the communication line 160. Then, on the condition that a signal indicating that the particular control unit 110 is determined as abnormal is received from at least one control unit of other control units 110, the operation of the control unit of the particular control unit 110 may be stopped.

Figure 7:
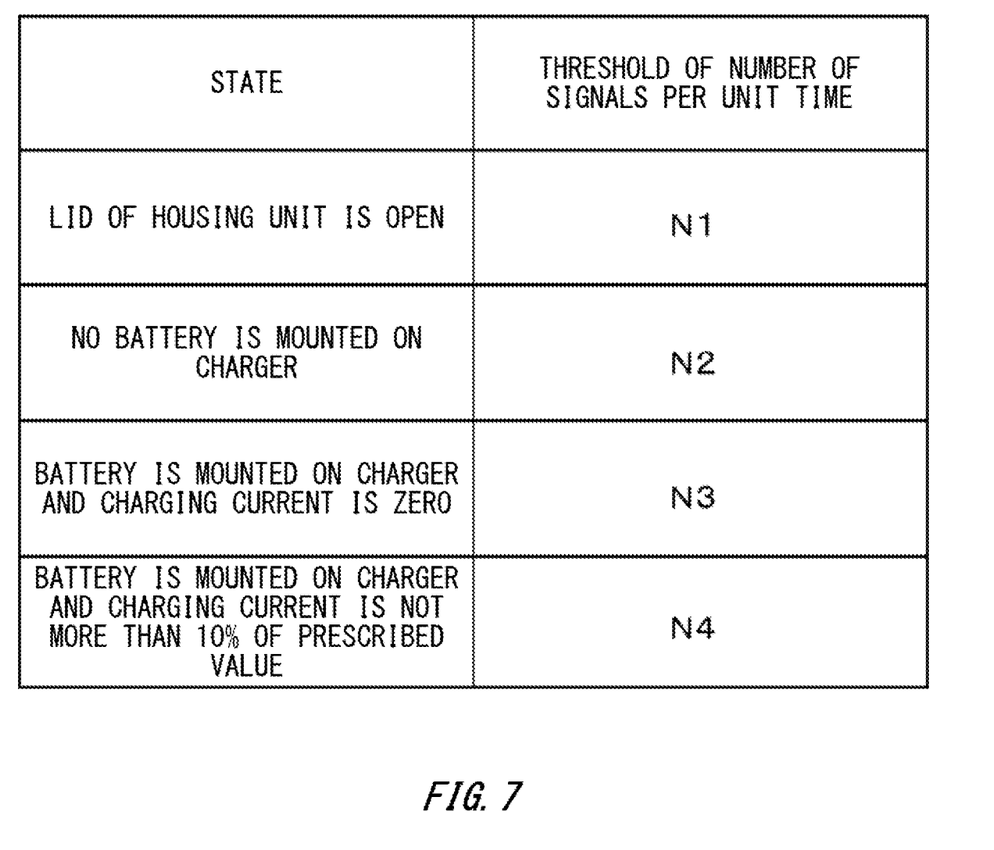
FIG. 7 illustrates information for judging abnormality in a table format.

FIG. 7 is a table of information for determining the abnormality of the control unit 110. This information is stored in the memory 370. The memory 370 stores the threshold of the number of signals per unit time transmitted from the control unit 110 in association with the state regarding the battery 140. States to be associated with the threshold include a state of the lid 132 of the housing unit 130, a state of the battery 140 mounted on the charger 120, a charging current to the battery 140, and so on.

As illustrated in FIG. 7, the memory 370 stores threshold N1, threshold N2, threshold N3, and threshold N14, respectively, in association with "a state in which the door of the housing unit is open", "a state in which no battery 140 is mounted on the charger 120", "a state in which the battery 140 is mounted on the charger and the charging current is zero", and "a state in which the battery 140 is mounted on the charger and the charging current is not more than 10% of a specified value".

When the lid 132 of the housing unit 130 is open, the detection unit 320 performs the abnormality determination in S610 of FIG. 6 based on the threshold N1. For example, the detection unit 320 calculates the number of signals per unit time transmitted from the specific control unit 110 from the number of signals within a time range between the present and a predetermined time in the past and predetermined time. Then, when the calculated number of signals per unit time exceeds the threshold N1, the detection unit 320 determines that the specific control unit 110 is abnormal.

As described above, according to the charge control device 150, the plurality of control units 110 monitor the information of the sensors included in the chargers 120. Further, the control units 110 mutually monitors the communication amount of the plurality of control units 110. Accordingly, the control units 110 can individually determine that, for example, when the lid 132 of the housing unit 130 is open, the communication amount of the corresponding control unit 110 has increased, or when the battery 140 is not mounted on the charger 120, the communication amount of the corresponding control unit 110 has increased. Thus, the abnormality of a specific control unit 110 can be determined by other control units 110 appropriately and quickly.

For example, there is a case where, in the charge control device 150, the control unit 110 corresponding to a specific charger 120 is illegally accessed through the terminal of the specific charger 120 to try to access another device of the charge control device 150 or the server 102 via the control unit 110. Even in such a case, in the charge control device 150, the other control unit 110 can appropriately and quickly detect the abnormality in the communication amount of the control unit 110. Therefore, it is possible to stop the spread of damage of unauthorized access at an early stage.

Figure 8:
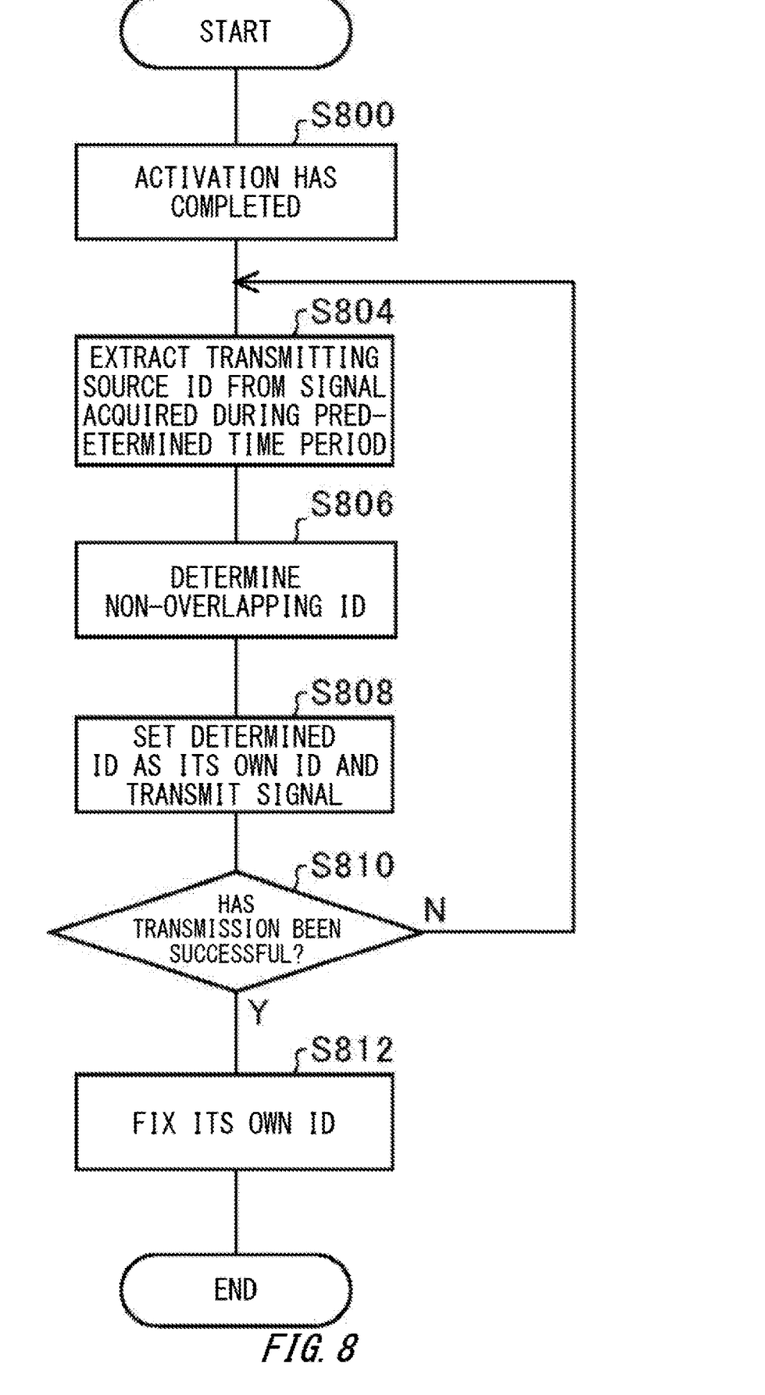
FIG. 8 is a flowchart illustrating processing related to a method of determining an ID of the control unit 110 in the charge control device 150.

FIG. 8 is a flowchart illustrating a process related to a method of determining the ID of the control unit 110 in the charge control device 150. Processing of this flowchart starts when the charge control device 150 is powered on.

When the charge control device 150 is powered on, the control unit 110 performs activation processing on its own. In S800, when its own activation processing is completed, the communication unit 380 of the control unit 110 acquires a signal transmitting through the communication line 160 for a predetermined time and extracts the ID of the communication source in S804.

In S806, the communication unit 380 determines an ID that does not overlap any of the IDs extracted in S804 as an ID of its own control unit 110. In one example, a fixed base ID "3" is assigned to all the control units 110, and identification among the plurality of control units 110 is performed using the extension ID. In this case, a value obtained by adding a predetermined value to the maximum value of the extension ID extracted from the signal transmitted through the communication line 160 may be determined as the extension ID of its own control unit.

In S808, the communication unit 380 sends a signal including the ID determined in S806 to the communication line 160.

In S810, the communication unit 380 determines whether the signal transmission in S808 has succeeded. If the signal transmission is not successful, the process returns to S804. If transmission of the signal is successful, in S812, the ID determined in S806 is fixed as its own ID.

By the processing illustrated in FIG. 8, it is possible to autonomously set IDs that do not collide with each other without assigning the fixed ID to the control unit 110 in advance. Therefore, when manufacturing the charge control device 150, it is not necessary to set the ID of the control unit 110 for each charge control device 150. As a result, the charge control device 150 can be configured using the control unit 110 manufactured with the same control specification.

The same applies to the case of manufacturing the charging unit 152 to be added to the charge control device 150. That is, when manufacturing the charging unit 152, it is not necessary to set the ID in the control unit 110d based on the ID of the charge control device 150 to which the charging unit 152 is attached. Therefore, any charging unit 152 manufactured with the same specification can be attached to the charge control device 150. In addition, it is not necessary to change the setting based on the ID of the charging unit 152 attached to the control logic related to the ID in the charge control device 150. Therefore, the management cost and the manufacturing cost of the charge control device 150 and the charging unit 152 can be reduced.

As described above, according to the charge control device 150, when the plurality of control units 110 mutually monitor the communication state, it is possible to appropriately detect an abnormality such as an unauthorized access in the control unit 110. Moreover, the management cost and manufacturing cost of the charge control device 150 including the plurality of control units 110 can be reduced.

The charging system 100 described above is not limited to the charging of the battery 140 of the electric motorcycle 22. The charging system 100 is applicable to charging of various other batteries. Further, the application range of the control device having a configuration in which a plurality of control units 110 mutually monitor the communication state like the charge control device 150 is not limited to the charge control device. The control device having such a configuration is applicable to various other control devices.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10 Control unit
11 Communication state acquisition unit
12 Detection unit
13 Suppression unit
20 User terminal
22 Electric motorcycle
30 Network
40 Battery
50 Charge control device
60 Communication line
80 Power line
90 Power supply
100 Charging system
102 Server
110 Control unit
120 Charger
130 Housing unit
132 Lid
140 Battery
150 Charge control device
152 Charging unit
158 Mounting unit
160 Communication line
170 Communication unit
172 Reader
180 Power line
182 Bidirectional AC/DC
184 AC/DC
190 Power supply 300 Charge/discharge controller
310 Communication state acquisition unit
320 Detection unit
330 Suppression unit
340 Driver
370 Memory
380 Communication unit

What is claimed is:

1. A charge control device, comprising:
a plurality of control units that are mutually connected by a communication line and control charging of different batteries, wherein
the control units each include
a communication state acquisition unit that acquires a communication state of another control unit of the control units through the communication line,
a detection unit that detects an abnormality of the other control unit based on the communication state of the other control unit acquired by the communication state acquisition unit, and
a suppression unit that suppresses an operation of the other control unit for which an abnormality is detected by the detection unit, wherein
the control units each control a corresponding charger of a plurality of chargers that charge different batteries, and control the charging of a battery mounted on the corresponding charger, and
the detection unit included in each of the control units detects the abnormality of the other control unit based on the communication state of the other control unit and a mounting state of a battery on the charger corresponding to the other control unit.

2. The charge control device according to claim 1, further comprising the chargers.

3. The charge control device according to claim 2, wherein
the control units are each connected to the battery connected to the corresponding charger of the chargers through a power line that supplies electric power to charge the battery, and communicate with the battery mounted on the corresponding charger through the power line.

4. The charge control device according to claim 2, wherein
the battery is attachable to and detachable from the charger.

5. The charge control device according to claim 4, wherein
the chargers each include a sensor that detects a mounting state of the battery on the charger,
the control units each acquire outputs of the sensors included in the chargers through the communication line, and
the detection unit included in each of the control units detects the abnormality of the other control unit based on the communication state of the other control unit and the output of the sensor included in the charger corresponding to the other control unit.

6. The charge control device according to claim 5, wherein
the sensor detects whether the battery is mounted on the charger, and
the detection unit included in each of the control units detects that an abnormality occurs in the other control unit when no battery is mounted on the charger and a communication amount of the other control unit exceeds a predetermined amount.

7. The charge control device according to claim 5, wherein
the sensor detects an open/close state of a lid of a housing unit for housing the battery, and
the detection unit included in each of the control units detects that an abnormality occurs in the other control unit when the lid is open and the communication amount of the other control unit exceeds a predetermined amount.

8. The charge control device according to claim 5, wherein
the sensor detects a current amount supplied from the charger to the battery, and
the detection unit included in each of the control units detects that an abnormality occurs in the other control unit when the current amount is smaller than a predetermined value and the communication amount of the other control unit exceeds a predetermined amount.

9. A charge control device, comprising:
a plurality of control units that are mutually connected by a communication line and control charging of different batteries, wherein
the control units each include
a communication state acquisition unit that acquires a communication state of another control unit of the control units through the communication line,
a detection unit that detects an abnormality of the other control unit based on the communication state of the other control unit acquired by the communication state acquisition unit, and
a suppression unit that suppresses an operation of the other control unit for which an abnormality is detected by the detection unit, and
the detection unit included in each of the control units detects that an abnormality occurs in the other control unit when a current amount supplied to the battery for which charging is controlled by the other control unit is smaller than a predetermined value and a communication amount of the other control unit exceeds a predetermined amount.

10. A charge control device, comprising:
a plurality of control units that are mutually connected by a communication line and control charging of different batteries, wherein
the control units each include
a communication state acquisition unit that acquires a communication state of another control unit of the control units through the communication line,
a detection unit that detects an abnormality of the other control unit based on the communication state of the other control unit acquired by the communication state acquisition unit, and
a suppression unit that suppresses an operation of the other control unit for which an abnormality is detected by the detection unit,
the control units each report, to other control units through the communication line, information indicating that an abnormality is detected in the other control unit when the abnormality of the other control unit is detected, and
the suppression unit included in each of the control units suppresses an operation of the other control unit for which an abnormality is detected when the abnormality is detected by a number of control units that exceeds a predetermined number of two or more.

11. The charge control device according to claim 1, further comprising:

a mounting unit on which to mount a charging unit that includes a charger for charging the battery and a control unit for controlling the charger, wherein the control unit included in the charging unit is connected to the communication line when the charging unit is mounted on the mounting unit, and the control unit included in the charging unit includes a communication state acquisition unit that acquires a communication state of each control unit through the communication line, a detection unit that detects an abnormality of each control unit based on the communication state of each control unit, and a suppression unit that suppresses an operation of one or more of the control units for which an abnormality is detected.

12. The charge control device according to claim 11, wherein the control units each extract identification information of other one or more control units from a signal transmitted through the communication line before starting communication with another control unit through the communication line after activation, determine identification information different from the identification information of the other one or more control units as its own identification information, and send out a signal including the determined identification information to the communication line.

13. A non-transitory computer readable storage medium storing a control program for a plurality of computers that are mutually connected by a communication line and control charging of different batteries, the control program to cause the computers to execute a procedure for controlling a corresponding charger of a plurality of chargers that charge the different batteries, and controlling the charging of the battery mounted on the corresponding charger;

a communication state acquisition procedure for acquiring a communication state of another computer of the computers through the communication line;

a detection procedure for detecting an abnormality of the other computer based on the communication state of the other computer acquired by the communication state acquisition procedure and a mounting state of the battery on the charger corresponding to the other computer; and a suppression procedure for suppressing an operation of the other computer for which an abnormality is detected by the detection procedure.

14. A non-transitory computer readable storage medium storing a control program for a plurality of computers that are mutually connected by a communication line and control charging of different batteries, the control program to cause the computers to execute a communication state acquisition procedure for acquiring a communication amount of another computer of the computers through the communication line;

a detection procedure for detecting that an abnormality occurs in the other computer when a current amount supplied to the battery for which charging is controlled by the other computer is smaller than a predetermined value and the communication amount of the other computer acquired by the communication state acquisition procedure exceeds a predetermined amount; and a suppression procedure for suppressing an operation of the other computer for which an abnormality is detected by the detection procedure.

15. A non-transitory computer readable storage medium storing a control program for a plurality of computers that are mutually connected by a communication line and control charging of different batteries, the control program to cause the computers to execute:

a communication state acquisition procedure for acquiring a communication state of another computer of the computers through the communication line;

a detection procedure for detecting an abnormality of the other computer based on the communication state of the other computer acquired by the communication state acquisition procedure;

a reporting procedure for reporting, to other computers through the communication line, information indicating that an abnormality is detected in the other computer when the abnormality of the other computer is detected by the detection procedure; and a suppression procedure for suppressing an operation of the other computer for which an abnormality is detected when the abnormality is detected by a number of computers that exceeds a predetermined number of two or more.

* * * * *